Dec. 21, 1965  R. A. ADEE  3,224,177
METHOD OF CUTTING, CONDITIONING AND WINDROWING A CROP
Filed Oct. 21, 1963  2 Sheets-Sheet 2
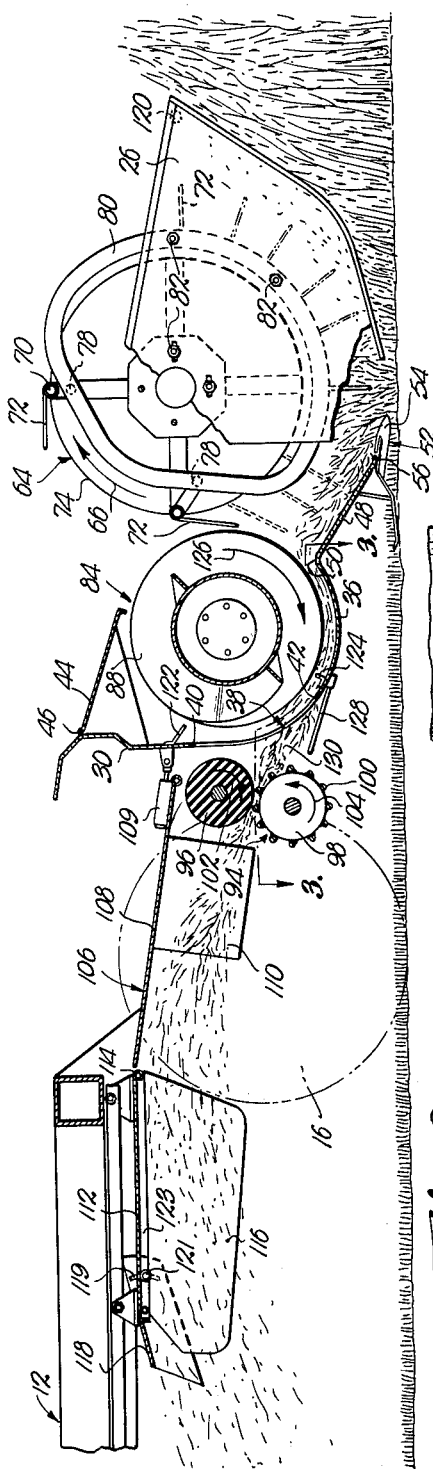
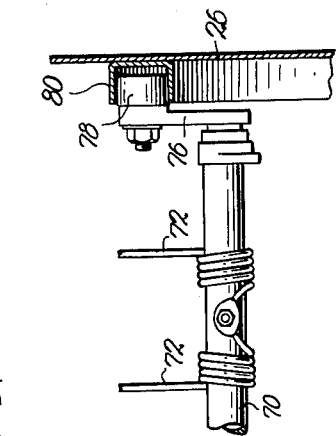
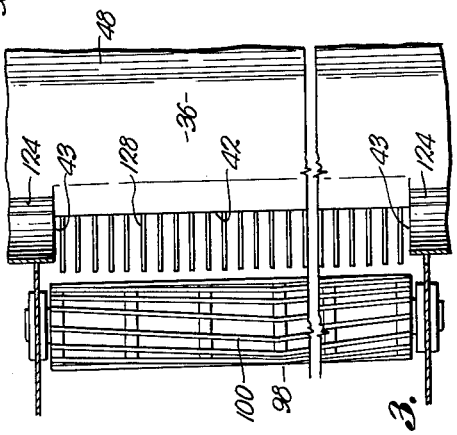
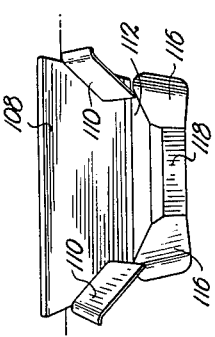
INVENTOR.
Raymond A. Adee
BY
Hovey, Schmidt, Johnson & Hovey
ATTORNEYS.

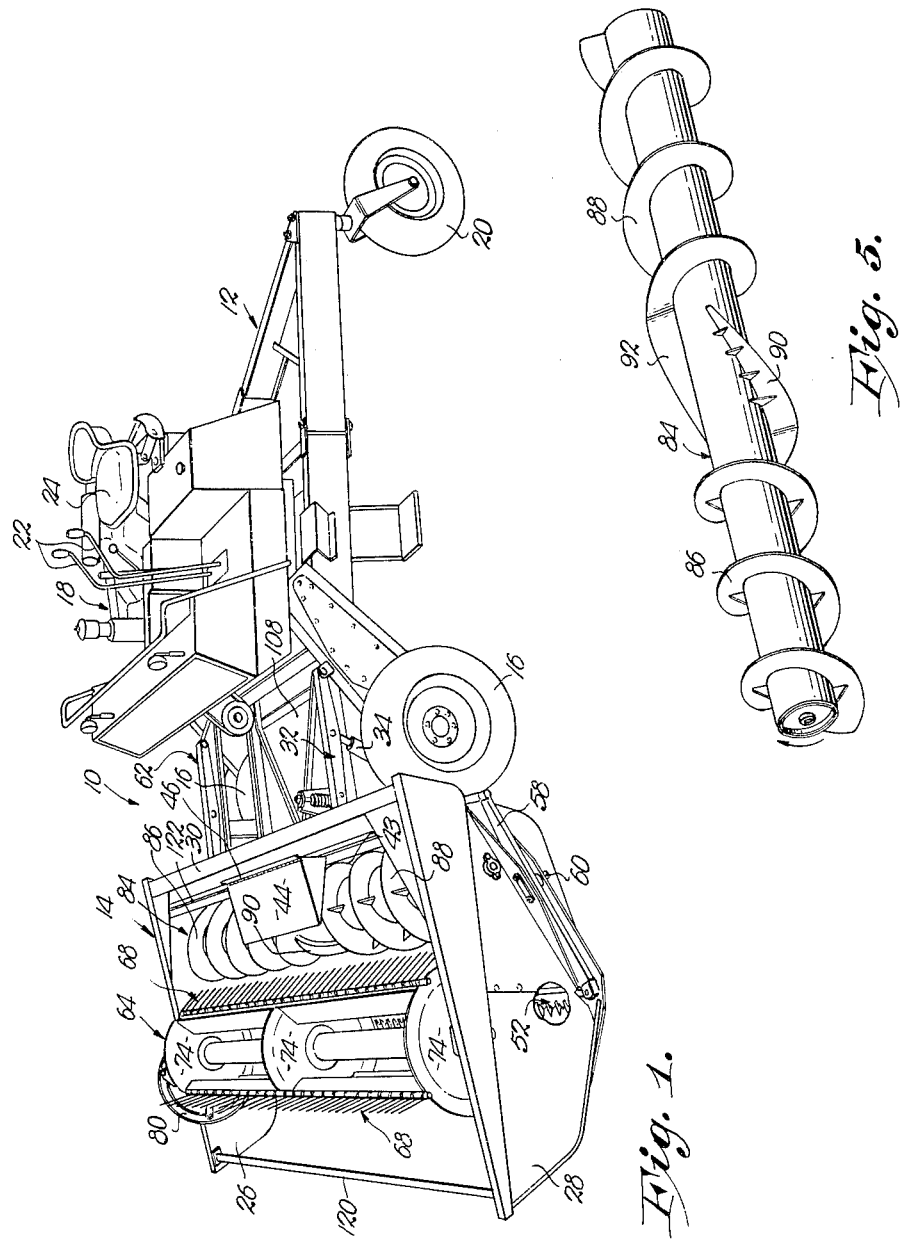

3,224,177
METHOD OF CUTTING, CONDITIONING AND WINDROWING A CROP
Raymond A. Adee, Newton, Kans., assignor to Hesston Manufacturing Co., Inc., Hesston, Kans., a corporation of Kansas
Filed Oct. 21, 1963, Ser. No. 317,557
6 Claims. (Cl. 56—23)

This invention relates to a farm implement of the crop harvesting type and, more particularly, to a machine of improved construction for cutting a growing crop from the ground and conditioning the latter immediately after the crop has been cut.

The present invention provides a machine which functions to successively and uninterruptedly perform the steps of cutting a growing crop, collecting the cut crop into a concentrated mass, conditioning the collected crop immediately after it has become concentrated and depositing the conditioned crop in a strategic location for subsequent use such as in a windrow. The machine is capable of performing these steps or operations more efficiently than conventional machines heretofore utilized for the same purpose by judiciously placing the various parts of the machine in optimum, relative dispositions so that substantially the entire crop that is cut will be deposited for subsequent use and the successive operations will be performed in a minimum of time. In addition, the machine is constructed to obviate conventional drapers and wooden parts which have been used on machines heretofore utilized so that problems involving the moisture content of crops are minimized, if not substantially eliminated.

It is, therefore, the primary object of the present invention to provide a machine capable of successively and uninterruptedly accomplishing the aforesaid operations in an expeditious manner and without wasting any portion of the crop such as by depositing it on the ground at the end of one operation and before the beginning of a subsequent operation.

Another object of the present invention is the provision of a machine of the type described which eliminates the need for conventional drapers and wooden parts to handle the cut crop during the time in which the various operations are being performed thereon so that problems encountered by conventional machines, due to the moisture in the crop, will be completely circumvented to thereby assure substantially uninterrupted operation of the machine for all moisture conditions of the crop.

A further object of the present invention is the provision of a machine of the aforesaid character which is provided with structure which force-feeds the crop through the machine during the time in which the various operations are being performed so that the crop need not, at any time during such operations, be deposited on the ground and, as a result, the handling of the crop is expedited and any waste of the crop, such as by leaving a portion of the crop on the ground, is completely eliminated.

Still another object of the present invention is the provision of a machine capable of performing the aforesaid operations on a large number of different types of crops, including large, loose hay crops and tall sorghums which must be force-fed into a conditioner and cannot be picked up off the ground by the conditioner itself.

Yet another object of the present invention is the provision of means within the aforementioned machine which separates dirt, rocks and other foreign matter from the crop before it is conditioned so that there will be no jamming of the conditioner and the conditioned crop will be substantially free of such matter at the point of deposit.

A further object of the present invention is the provision of apparatus for presenting a growing crop to the cutter of the machine in a manner such that the crop will be cleanly and uniformly cut at a predetermined height above the ground without excessive stubble and while at the same time eliminating any tendency of the crop to become matted beneath the cutter.

In the drawings:

FIGURE 1 is a perspective view of the machine of the present invention;

FIG. 2 is an enlarged, side elevational view, partly in section of the machine and illustrating a growing crop in advance thereof and the passage of a cut crop therethrough as the crop is being subjected to a number of successive, uninterrupted operations thereon;

FIG. 3 is a cross-sectional view taken along line 3—3 of FIG. 2;

FIG. 4 is a perspective view looking upwardly and rearwardly toward the deflecting apparatus which effects the formation of the crop in a stream of a predetermined width prior to depositing the crop at a strategic location;

FIG. 5 is a perspective view of the auger and the impelling means thereon for force-feeding a crop into a crop conditioner located between the deflectors illustrated in FIG. 4 and the impelling means at the center of the auger; and FIG. 6 is an enlarged, fragmentary, rear elevational view, partly in section, of the reel and the oscillatable tines thereof for presenting a growing crop to the cutter of the machine and for projecting a cut crop rearwardly toward the auger thereof.

The machine of the present invention is broadly denoted by the numeral 10 and includes a vehicle 12, an apparatus 14 coupled to the normally forwardmost end of vehicle 12 for performing a number of successive, uninterrupted operations on a crop disposed in a growing condition in advance of vehicle 12.

Vehicle 12 includes a pair of forward, ground-engaging wheels 16 driven by structure (not shown) coupled with a prime mover 18 such as a gasoline-powered, internal combustion engine. A rear wheel 20 is swivelly mounted on vehicle 12 to permit changes in direction of the vehicle when one of the wheels 16 is driven in one direction with respect to the other wheel, either by holding the other wheel stationary or by causing it to be driven in the opposite direction.

A transmission system (not shown) controlled by a pair of control sticks 22, manipulatable by an operator in position on seat 24, independently drives wheels 16 so that one wheel 16 may be driven with respect to the other wheel 16 to effect turning of the vehicle 12, or both wheels 16 may be driven at the same time and at the same speed to effect forward or reverse movements of vehicle 12.

Apparatus 14 includes a pair of sides 26 and 28 which extend forwardly from vehicle 12 in the direction of forward movement thereof and a back 30 spanning the distance between and secured to the rearmost extremities of sides 26 and 28. A linkage 32 couples back 30 to the forward extremity of vehicle 12, and power-actuated means 34 in the nature of a fluid-actuated piston and cylinder assembly is disposed for raising and lowering apparatus 14 with respect to the ground over which vehicle 12 travels.

A trough 36 spans the distance between sides 26 and 28 and is coextensive with back 30 as shown in FIG. 2. An opening 38 defined by an upper, horizontal edge 40 and a lower, horizontal edge 42, is disposed partially in back 30 and partially in trough 36. The side edges 43, only one of which is shown in FIG. 1 defining opening 38, are spaced inwardly from sides 26 and 28 and underlie the side edges of a shield 44 hinged at 46 to the forward face of back 30, as shown in FIGS. 1 and 2.

An inclined ramp 48 is coextensive with the forwardmost, longitudinal edge of trough 36 and extends downwardly and forwardly therefrom as shown in FIG. 2. The junction 50 between trough 36 and ramp 48 is rounded to provide a smooth transition point for a crop moving rearwardly up ramp 48 and into trough 36. Ramp 48 spans the distance between sides 26 and 28 and is coupled to a cutter bar assembly 52 rigid to the forwardmost, lower end of ramp 48 as shown in FIG. 2.

Assembly 52 includes stationary sickle guards 54 and a sickle bar 56 shiftable relative to guards 54 by a sway bar 58 pivoted intermediate its end thereof by a pivot 60. Coupling means 62, shown in FIG. 1, interconnects prime mover 18 with sway bar 58 for reciprocating the latter to thereby actuate assembly 52 to sever or cut a growing crop between guards 54. A reel 64 is journaled in sides 26 and 28 in spanning relationship thereto for rotation about a generally horizontal axis disposed above and forwardly of cutter bar assembly 52 as shown in FIG. 2. Coupling means 62 interconnects reel 64 with prime mover 18 to rotate reel 64 in the direction shown by the arrow 66 in FIG. 2.

Reel 64 carries a number of sets 68 of tines at circumferentially spaced locations thereon. Each set 68 includes a shaft 70 having a number of tines 72 projecting outwardly therefrom, shaft 70 being rotatably mounted at the peripheries of a number of axially-spaced wheels 74. A crank arm 76 is coupled to one end of shaft 70 and projects laterally therefrom. A roller 78 is journaled on the outer end of crank arm 76 and received within a transversely C-shaped member 80 of irregular configuration and which forms camming structure for crank arm 76 and thereby shaft 70. Member 80 is disposed to cause tines 72 to extend radially outwardly relative to the axis of rotation of reel 64 during the time when tines 72 move downwardly to the lowermost extremity of reel 64 from substantially the uppermost extremity thereof. This is illustrated in FIG. 2 wherein the tines 72 extend radially outwardly from the forwardmost extremity of reel 64 and also extend radially outwardy at the lowermost extremity of reel 64.

As tines 72 once again move rearwardly and upwardly toward the uppermost extremity of reel 64, member 80 causes tines 72 to move toward a location substantially tangential to the peripheries of wheels 74 for a purpose hereinafter described. The intermediate positions of tines 72 as the same progress upwardly and rearwardly are shown in dashed lines.

An auger 84 is journaled in sides 26 and 28 and spans the distance between the latter rearwardly of reel 64. The axis of rotation of auger 84 is horizontal and disposed rearwardly and below the axis of rotation of reel 64 as shown in FIG. 2. Auger 84 substantially overlies trough 36 and is provided with first and second flights 86 and 88 which are opposite in sense to convey a crop within trough 36 toward the center of the latter and into alignment with opening 38. A pair of impellers 90 and 92 are coextensive with the iner ends of flights 86 and 88 respectively, and are disposed in alignment with opening 38 to impel a crop rearwardly of trough 36 and through opening 38. In this respect, the pitch of impellers 90 and 92 is substantially less than the pitch of either of flights 86 or 88.

A crop conditioner 94 is disposed rearwardly of back 30 and aligned with opening 38 for receiving the crop impelled rearwardly by impellers 90 and 92. Conditioner 94 may be any one of a number of different types of crop conditioners, but as illustrated in FIGS. 2 and 3, includes a conditioner having an upper roller 96 of hard rubber, and a lower roller 98 formed of angularly disposed metallic rods 100 in substantial contact with the peripheral surface of roller 96. Coupling means 62 interconnects rollers 96 and 98 with prime mover 18 for rotating rollers 96 and 98 in the directions denoted by arrows 102 and 104, respectively. As shown in FIG. 2, the axis of rotation of roller 96 is disposed above and forwardly of the axis of rotation of roller 98.

Rollers 96 and 98 condition a crop passing therebetween from opening 38 by intermittently cracking and splitting the stems of the crop lengthwise so that drying of the crop will be enhanced without damage to the crop itself. The type of conditioner illustrated and described herein is disclosed in U.S. Letters Patent No. 3,085,384, filed March 30, 1960, and entitled "Crop Conditioner."

Deflector structure broadly denoted by the numeral 106 is disposed above and extends rearwardly from conditioner 94 as shown in FIG. 2. Structure 106 includes a first panel 108 which is adjacent back 30, is pivotally connected thereto by a coupling device 109, and is inclined upwardly and rearwardly of conditioner 94. A pair of wings 110, only one of which is shown in FIG. 2, is adjustably secured to the lower surface of panel 108 and diverge as shown in FIG. 4 as conditioner 94 is approached. Wings 110 serve to form the crop by narrowing the width of the stream of crop emerging from conditioner 94.

A second panel 112 is carried beneath vehicle 12 and is provided with a hinge 114 connected to the proximal edge of panel 108, so that the latter can swing about a horizontal axis as apparatus 14 is raised and lowered. Thus, panel 108 is always above conditioner 94 regardless of the position of apparatus 14 above the ground.

A pair of forming shields 116 is disposed adjacent opposed side edges of panel 112 to cause the further forming of a crop as the latter flows in a stream rearwardly of conditioner 94. Like wings 110, shields 116 diverge as conditioner 94 is approached. Shields 116 are adjustably mounted on panel 112 so that the width of the formed crop can be varied.

A deflector 118 is hinged at the rearmost end of panel 112 and disposed for directing a crop flowing in a stream downwardly and rearwardly with respect to panel 112. Deflector 118 is normally positioned, when machine 10 is in operation, in a fixed location, but it is adjustable relative to panel 112 for movement into other locations by virtue of a slot 119 therein which receives bolt means 121 carried by a side flange 123 of panel 112.

A bar 120 is secured to and spans the distance between the forwardmost extremities of sides 26 and 28 to cause a tall crop to lean forwardly when engaged by bar 120 and until the crop is cut by assembly 52.

A pair of upper and lower stripper elements 122 and 124 are disposed adjacent the upper and lower edges 40 and 42 defining respective boundaries of opening 38. Elements 122 and 124 prevent the winding of crop on auger 84 as the latter rotates in the direction denoted by the arrow 126.

A finger grate 128 is secured to the underside of trough 36 and underlies opening 38 as shown in FIG. 3. Grate 128 permits the separation of dirt, rocks and other foreign material from the crop by gravitation as the crop moves in a stream upwardly and rearwardly through opening 38 toward conditioner 94.

In operation, machine 10 is used to harvest a growing crop by performing the successive, uninterrupted steps of pushing a swath of the crop forwardly by bar 120, while at the same time, the swath is being swept rearwardly and upwardly toward the cutting zone of assembly 52 and toward the collection area defined by trough 36 which is above and to the rear of assembly 52. After the swath of crop is cut by assembly 52, the crop is swept upwardly of ramp 58 which provides a catching station for the crop and thence, the crop is moved into trough 36 under the action of tines 72. The crop is thus moved smoothly, continuously and uniformly to an elevation higher than that of assembly 52 and thus is maintained off the ground at all times until the crop is deflected donwardly and rearwardly by deflector 118.

The swath of the crop, after being cut at the cutting zone by assembly 52, is caught at the elongated, transversely disposed station defined by ramp 48 which is disposed at an elevation higher than the zone of cutting at assembly 52. The zone of cutting and the station are both coextensive in length and parallel with the swath of the cut crop.

Continued rotation of reel 64 causes the swath of cut crop to move transversely of the station or ramp without interruption thereon, and in a direction upwardly and rearwardly from the zone of cutting while the crop remains in a condition spread along the length of the ramp and prior to the collecting of the crop on the upper surface of the ramp.

The tines further force the projected swath of crop over junction 50 and into trough 36 at which location the crop is subjected to the action of flights 86 and 88 which shift the collected swath laterally and inwardly of sides 26 and 28 into a mass concentrated midway the ends of auger 84. Thus, the swath moves toward opening 38 while subsequent swaths continue to be forced into trough 36 by tines 72. Shield 44 over opening 38 serves to prevent dust and chaff to be thrown upwardly as impellers 90 and 92 project the crop through opening 38.

It is to be emphasized that tines 72 continue to move the swath into trough 36 even though the tines are moving in their up-stroke and into relatively close proximity to the peripheries of flights 86 and 88. As shown in FIG. 2, the tips of tines 72 just clear flights 86 and 88 while at the same time prevent the formation of "dead spots" directly forwardly of junction 50.

As the crop is concentrated in a mass at the center of auger 84, the crop is disposed in alignment with opening 38 and continued rotation of auger 84 causes impellers 90 and 92 to impel the concentrated mass of crop in a continuous stream denoted by the numeral 130, outwardly of trough 36 and through opening 38 along a path normal to trough 36 and extending upwardly and rearwardly therefrom. It is noted that strippers 122 and 124 restrain the collected swath against rearward movement out of the trough while the swath is being moved into a concentrated mass aligned with opening 38.

As the crop moves out of opening 38, dirt, rocks and other foreign matter gravitate from stream 130 and through finger grate 128 and onto the ground. Thus, the crop passing between rollers 96 and 98 for purposes of conditioning, will be substantially free of such matter. The stream 130 of the crop will pass between rollers 96 and 98 and will be conditioned thereby. The crop will then be projected upwardly and rearwardly by the continued rotation of rollers 96 and 98 until the stream is deflected by panel 112 for movement in a substantially horizontal path.

Wings 110 and shields 116 gather the conditioned crop laterally and inwardly from both directions transversely of the path of the stream 130 and, deflector 118 deflects the gathered crop downwardly toward the ground. The crop will thereupon gravitate to the ground and lay on the latter in a fluffy, unmatted condition in a windrow, the width of which is governed by the setting of wings 110 and shields 116 relative to panels 108 and 112 respectively.

It is to be emphasized that the operations performed on the swath of crop are successive and uninterrupted so that the complete cycle of operation of machine 10 is performed in a minimum of time. Moreover, such operations are performed without causing the crop at any time to be deposited on the ground so that there is no need to pick the crop up from the ground to perform a subsequent operation thereon.

In addition, the combing action of tines 74 presents the crop to the cutter assembly 52 in a manner such that the crop is cleanly and uniformly cut at its base without leaving excessive stubble protruding from the ground. The tines further serve to project the cut crop along the ramp 48 and into trough 36 without creating excessive masses of the crop in the vicinity of junction 50.

Conditioner 94 may be removed from machine 10 when the latter is utilized with crops which need not be conditioned. In such cases, the crop projected rearwardly by impellers 90 and 92 moves in stream 130 and onto the ground without being deflected by structure 106 since panels 108 and 112 are needed only when conditioner 94 is employed.

Having thus described the invention, what is claimed as new and desired to be secured by Letters Patent is:

1. A harvesting method comprising the successive, uninterrupted steps of sweeping a swath of a growing crop rearwardly and upwardly toward an elongated cutting zone and toward an elongated collection area disposed above and to the rear of said cutting zone, cutting the swath at said zone while the crop is being swept thereinto, and thereupon conveying the cut crop smoothly, continuously and uniformly to higher elevations while it is maintained off the ground by:

catching the entire swath of the cut crop at an elongated, transversely inclined station extending upwardly and rearwardly from said zone, said zone, said station, and said area being coextensive in length with and parallel to said swath, said collection area extending rearwardly from the uppermost and rearmost longitudinal extremity of said station;

disposing said entire swath of the cut crop over and onto said station by forces applied to the crop from directly above the station continuously in a direction extending upwardly and rearwardly from said zone, and while the crop remains in a condition spread along said station longitudinally of the latter, combing the swath disposed on said station rearwardly along the entire length of said extremity closely adjacent the latter and along a region extending upwardly therefrom and coextensive in length therewith to forceably direct the swath into said collection area;

shifting the swath laterally within and along said region and said area into a concentrated mass; and projecting the concentrated mass in a continuous stream flowing along a path normal to, and extending upwardly and rearwardly from said area.

2. The invention of claim 1:

conditioning said crop while the same is in flight flowing in said stream; and feeding the conditioned crop to a place of deposit.

3. The invention of claim 2:

and removing foreign matter from the crop prior to conditioning and while it flows in said stream.

4. The invention of claim 1:

and pushing the growing crop forwardly, the step of sweeping the growing crop rearwardly and upwardly toward said zone occurring while the crop is being pushed.

5. The invention of claim 1:

and restraining the collected swath against rearward movement out of said area while it is being shifted.

6. The invention of claim 1:

and pushing the growing crop forwardly, the step of sweeping the growing crop rearwardly and upwardly toward said zone occurring while the crop is being pushed;

conditioning the cut crop while the same is in flight flowing in said stream;
removing foreign matter from the crop prior to conditioning and while it flows in said stream; and
feeding the conditioned crop to a place of deposit.

References Cited by the Examiner
UNITED STATES PATENTS

| | | | |
|---|---|---|---|
| 2,747,357 | 5/1956 | Bert et al. | 56—1 |
| 2,763,114 | 9/1956 | Carruthers | 56—1 |
| 2,908,126 | 10/1959 | Dyrdahl | 56—1 |
| 2,918,776 | 12/1959 | Coultas | 56—1 |
| 3,079,742 | 3/1963 | Balzer | 56—23 |
| 3,090,183 | 5/1963 | Thompson | 56—1 |
| 3,106,052 | 10/1963 | Ingram | 56—1 |
| 3,151,429 | 10/1964 | Dyrdahl | 56—23 |

ABRAHAM G. STONE, *Primary Examiner.*
ANTONIO F. GUIDA, *Examiner.*